(12) United States Patent
Barton

(10) Patent No.: US 11,649,872 B2
(45) Date of Patent: May 16, 2023

(54) SHOCK ABSORBER DUST GAITER WITH IMPROVED INSTALLATION

(71) Applicant: Ford Global Technologies, LLC, Dearborn, MI (US)

(72) Inventor: Robert Barton, Farmington Hills, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 115 days.

(21) Appl. No.: 17/393,828

(22) Filed: Aug. 4, 2021

(65) Prior Publication Data
US 2023/0039538 A1 Feb. 9, 2023

(51) Int. Cl.
*F16F 9/38* (2006.01)
*F16F 9/32* (2006.01)
*B60G 15/06* (2006.01)

(52) U.S. Cl.
CPC .............. *F16F 9/38* (2013.01); *B60G 15/062* (2013.01); *F16F 9/3207* (2013.01);
(Continued)

(58) Field of Classification Search
CPC ...... F16F 9/38; F16F 9/3207; F16F 2230/105; B60G 15/062; B60G 2202/312;
(Continued)

(56) References Cited

U.S. PATENT DOCUMENTS

| 6,199,844 B1 * | 3/2001 | McCormick ....... B60G 21/0551 |
| | | 267/221 |
| 9,752,640 B2 | 9/2017 | Mrugalla et al. |

(Continued)

FOREIGN PATENT DOCUMENTS

| DE | 10253221 B3 * | 8/2004 | ........... B60G 15/062 |
| DE | 112017003293 T5 * | 3/2019 | ........... B60G 13/005 |

(Continued)

*Primary Examiner* — Karen Beck
*Assistant Examiner* — Scott F. Underwood
(74) *Attorney, Agent, or Firm* — Burr & Forman, LLP; Lorne Forsythe

(57) ABSTRACT

A shock absorber for a vehicle suspension system may include a damper tube having an axis defining an axial direction extending between a first end and a second end, a bumper cap, and a dust gaiter operably coupled to the bumper cap. The bumper cap may have a cover portion and a retention portion. The cover portion may be operably coupled to the second end of the damper tube, and the retention portion may extend along a lateral periphery of the damper tube to an opposite end of the bumper cap relative to the cover portion. The retention portion may include a continuous ring at a distal end of the bumper cap relative to the cover portion to define a limit for movement of the dust gaiter along the bumper cap in the axial direction. The continuous ring may be retained by a plurality of fixed fingers that extend from the cover portion to the continuous ring. A movable finger is disposed between each of the fixed fingers, each instance of the movable finger having a radially extending locking tab to engage the dust gaiter. Each instance of the moveable finger has a radial deflection rate of less than about 8 N/mm.

20 Claims, 8 Drawing Sheets

(52) U.S. Cl.
CPC .... *B60G 2202/312* (2013.01); *B60G 2204/40* (2013.01); *B60G 2206/012* (2013.01); *B60G 2206/41* (2013.01); *B60G 2800/162* (2013.01); *F16F 2230/105* (2013.01)

(58) Field of Classification Search
CPC .......... B60G 2204/40; B60G 2206/012; B60G 2206/41; B60G 2800/162
See application file for complete search history.

(56) References Cited

U.S. PATENT DOCUMENTS

| | | | |
|---|---|---|---|
| 10,457,107 B2* | 10/2019 | Lindemann | B60G 15/063 |
| 2003/0218286 A1* | 11/2003 | Miyazaki | F16F 1/126 |
| | | | 267/220 |
| 2006/0049015 A1* | 3/2006 | Schuyten | F16F 9/56 |
| | | | 188/322.17 |
| 2009/0145707 A1* | 6/2009 | Henneberg | F16F 9/38 |
| | | | 188/322.12 |
| 2014/0252707 A1* | 9/2014 | Fleniken | F16F 9/38 |
| | | | 267/220 |
| 2015/0158363 A1* | 6/2015 | Patil | B60G 11/22 |
| | | | 267/220 |
| 2019/0170205 A1* | 6/2019 | Wichary | F16F 9/38 |
| 2019/0331192 A1* | 10/2019 | Górski | F16F 9/36 |

FOREIGN PATENT DOCUMENTS

| | | | | |
|---|---|---|---|---|
| DE | 102019215746 A1 | | 11/2020 | |
| DE | 102020211365 A1 | * | 3/2022 | |
| JP | 5958437 B2 | | 8/2016 | |
| JP | 5960034 B2 | * | 8/2016 | .......... B60G 11/265 |
| KR | 20200115755 A | * | 10/2020 | |

* cited by examiner

SHOCK ABSORBER DUST GAITER WITH IMPROVED INSTALLATION

TECHNICAL FIELD

Example embodiments generally relate to vehicle suspension and, more particularly, relate to a suspension system with an easy to install dust gaiter for a suspension damper or shock absorber.

BACKGROUND

Vehicles commonly employ independent suspension that allows each wheel to move relative to the vehicle chassis independent of the other wheels. The components and geometries used for independent suspension designs can vary to some degree. However, a typical independent suspension system will employ dampers or shock absorbers (or simply "shocks") that are designed to provide damping for pitch (i.e., oscillation about a lateral axis of the vehicle). The shocks generally resist compression and rebound with damping forces that are applied over a range of travel of a piston rod.

The shocks selected for a particular vehicle are generally chosen based on the expectation of normal pitch scenarios that are encountered during routine driving conditions. Some typical suspension components that may be considered for selection include springs and dampers (e.g., gas shocks). Moreover, some shocks employ what is referred to as a coil-over design in which a coil spring is provided coaxial with the damper such that the damper is inside the coil spring. These coil-over shocks often employ some form of dust gaiter or bellows that is used to prevent dust, dirt or debris from fouling the interface between the rod and the damper tube of the damper or shock. In a typical situation, a bumper cap may be used to provide a seating surface for the dust gaiter on the damper tube. The dust gaiter is typically assembled onto the bumper cap through the coils of the spring by hand, which generally makes such installation relatively difficult to achieve since clearance between the coils can vary.

BRIEF SUMMARY OF SOME EXAMPLES

In accordance with an example embodiment, a shock absorber for a vehicle suspension system may be provided. The shock absorber may include a damper tube having an axis defining an axial direction extending between a first end and a second end, a bumper cap, and a dust gaiter operably coupled to the bumper cap. The bumper cap may have a cover portion and a retention portion. The cover portion may be operably coupled to the second end of the damper tube, and the retention portion may extend along a lateral periphery of the damper tube to an opposite end of the bumper cap relative to the cover portion. The retention portion may include a continuous ring at a distal end of the bumper cap relative to the cover portion to define a limit for movement of the dust gaiter along the bumper cap in the axial direction. The continuous ring may be retained by a plurality of fixed fingers that extend from the cover portion to the continuous ring. A movable finger is disposed between each of the fixed fingers, each instance of the movable finger having a radially extending locking tab to engage the dust gaiter. Each instance of the moveable finger has a radial deflection rate of less than about 8 N/mm.

In another example embodiment, a bumper cap for a shock absorber of a vehicle suspension system may be provided. The bumper cap may include a cover portion for interfacing with a damper tube of the shock absorber, and a retention portion. The damper tube may have an axis defining an axial direction extending between a first end and a second end. The retention portion may extend along a lateral periphery of the damper tube to an opposite end of the bumper cap relative to the cover portion. The retention portion may include a continuous ring at a distal end of the bumper cap relative to the cover portion to define a limit for movement of a dust gaiter along the bumper cap in the axial direction. The continuous ring may be retained by a plurality of fixed fingers that extend from the cover portion to the continuous ring. A movable finger may be disposed between each of the fixed fingers. Each instance of the movable finger may have a radially extending locking tab to engage the dust gaiter. The moveable finger may have a radial deflection rate of less than about 8 N/mm.

In yet another example embodiment, a suspension system for a vehicle may be provided. The suspension system may include a chassis, a wheel, and a coil-over shock absorber operably coupling the chassis and the wheel. The shock absorber may include a damper tube having an axis defining an axial direction extending between a first end and a second end, a bumper cap having a cover portion and a retention portion, and a dust gaiter operably coupled to the bumper cap. The cover portion may be operably coupled to the second end of the damper tube, and the retention portion may extend along a lateral periphery of the damper tube to an opposite end of the bumper cap relative to the cover portion. The retention portion may include a continuous ring at a distal end of the bumper cap relative to the cover portion to define a limit for movement of the dust gaiter along the bumper cap in the axial direction. The continuous ring may be retained by a plurality of fixed fingers that extend from the cover portion to the continuous ring. A movable finger may be disposed between each of the fixed fingers. Each instance of the movable finger may have a radially extending locking tab to engage the dust gaiter. The moveable finger may have a radial deflection rate of less than about 8 N/mm.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 3A:
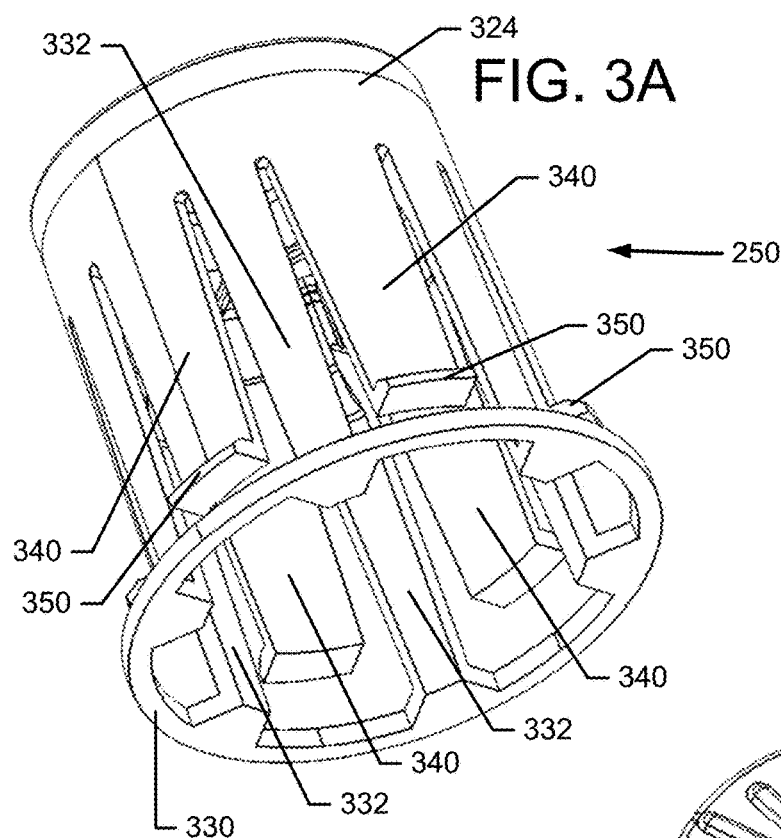
Figure 3B:
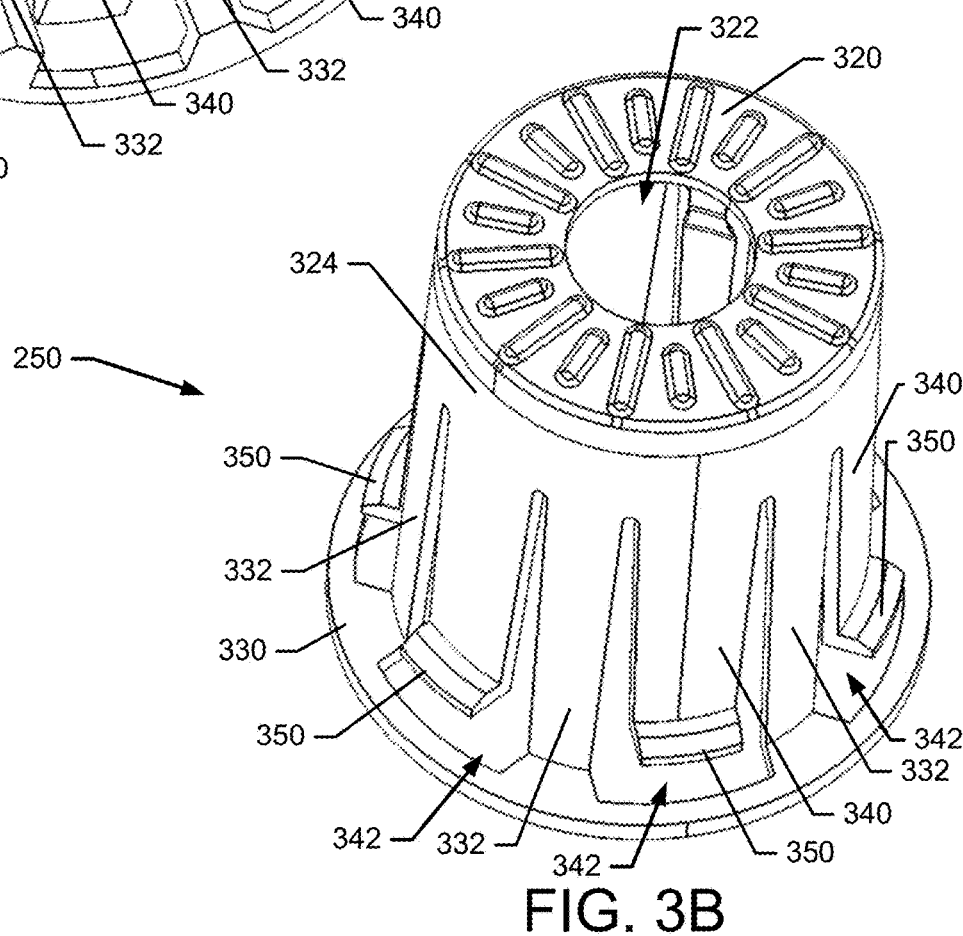
Figure 4:
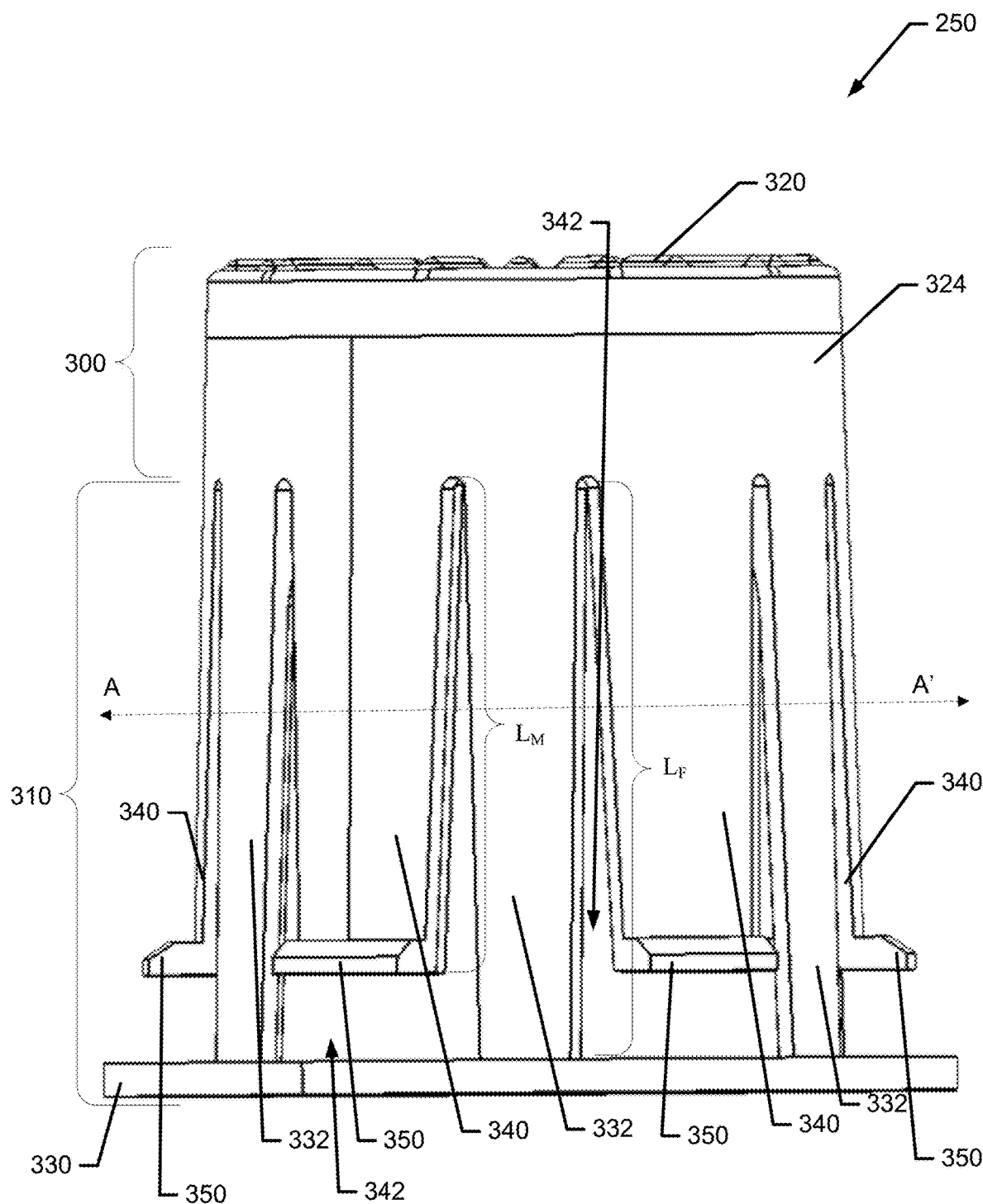
Figure 5:
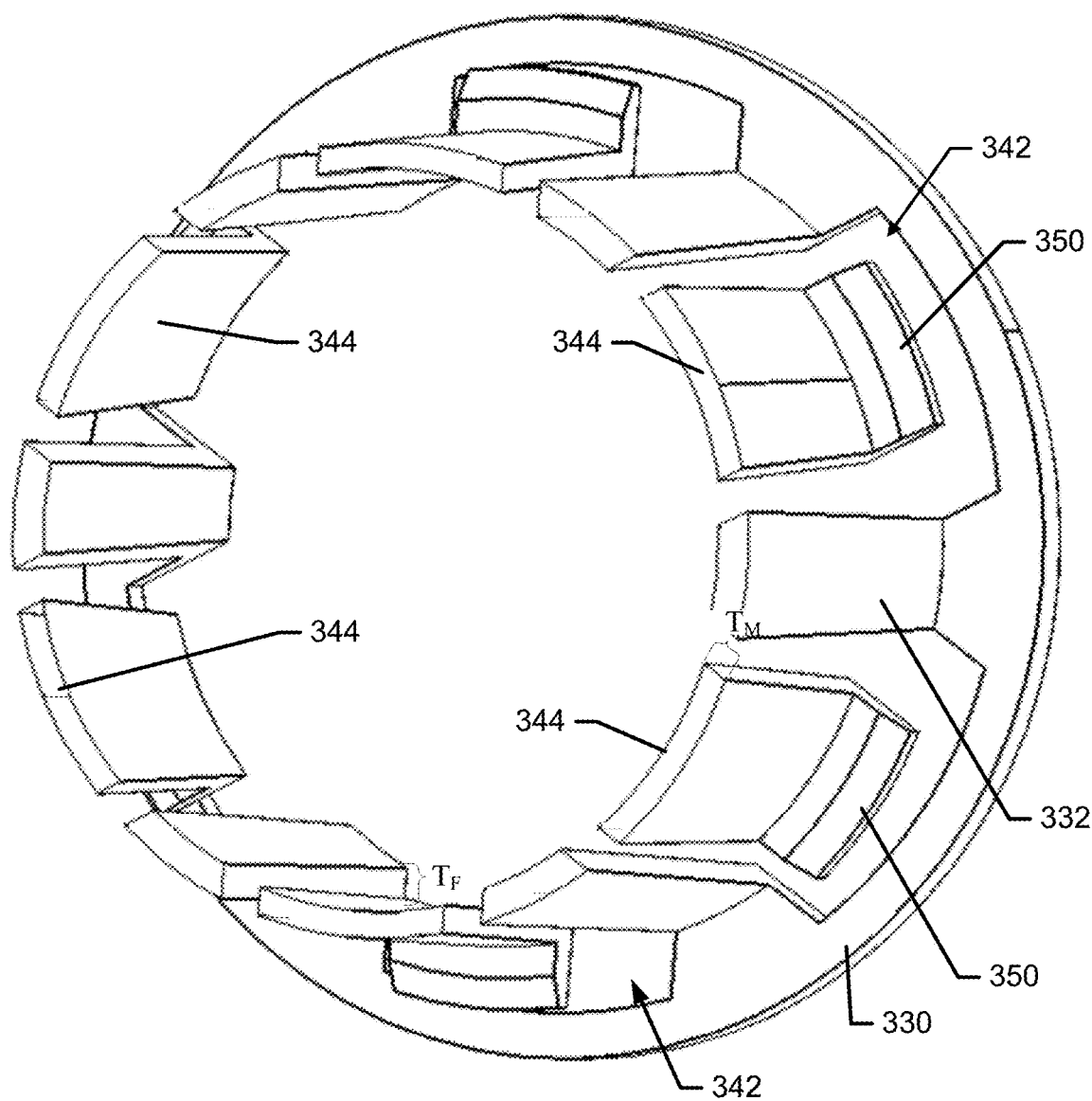
Figure 6:
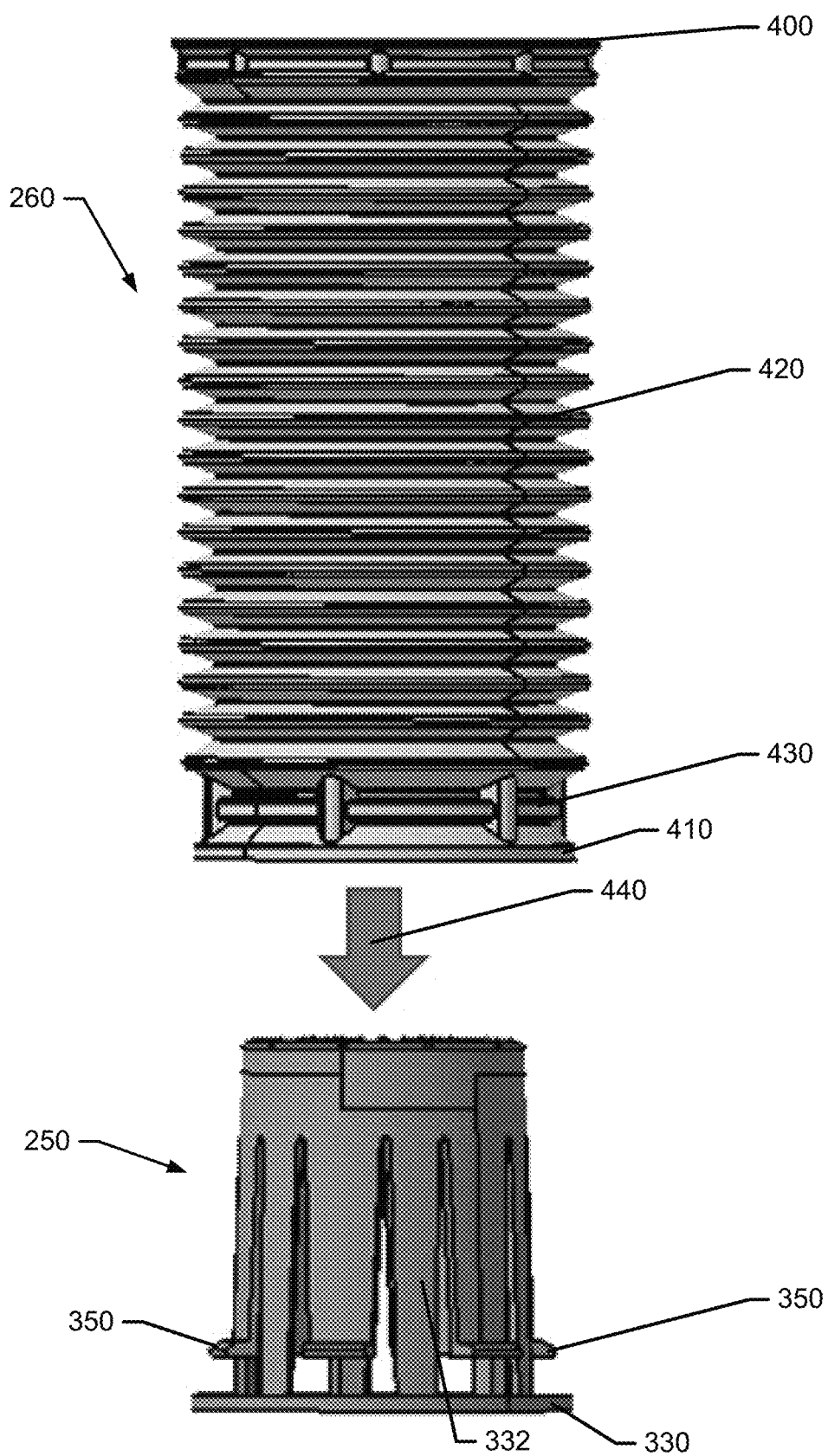
Figure 7:
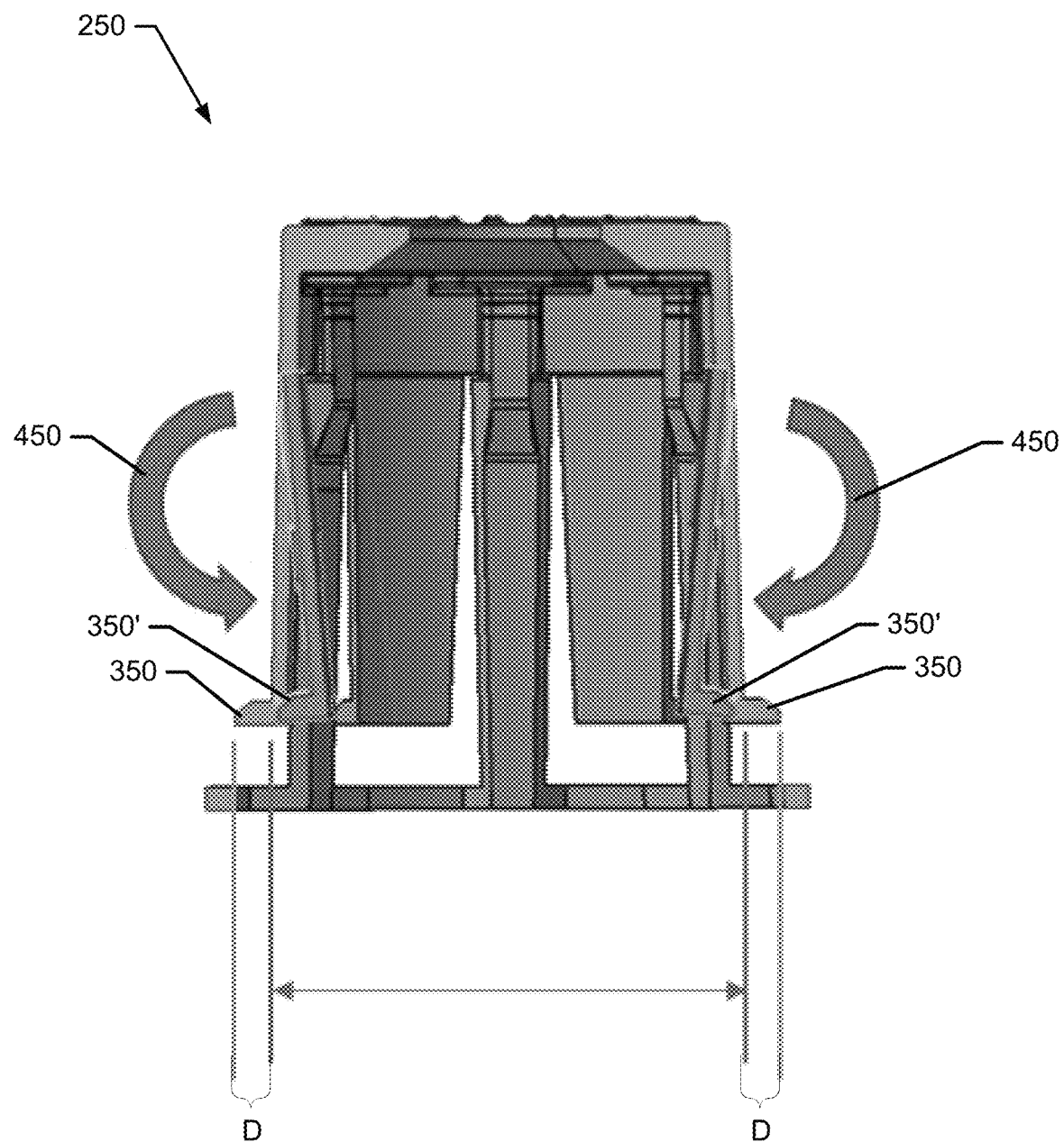
Figure 8:
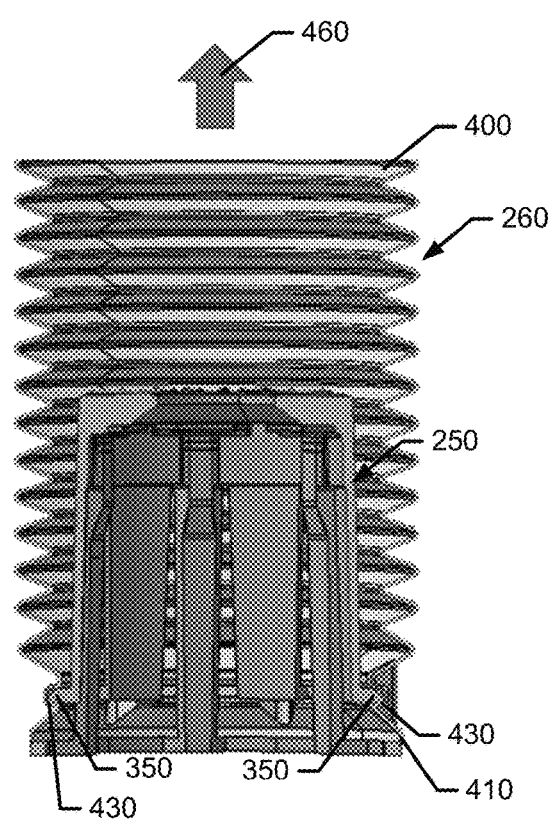
Figure 9:
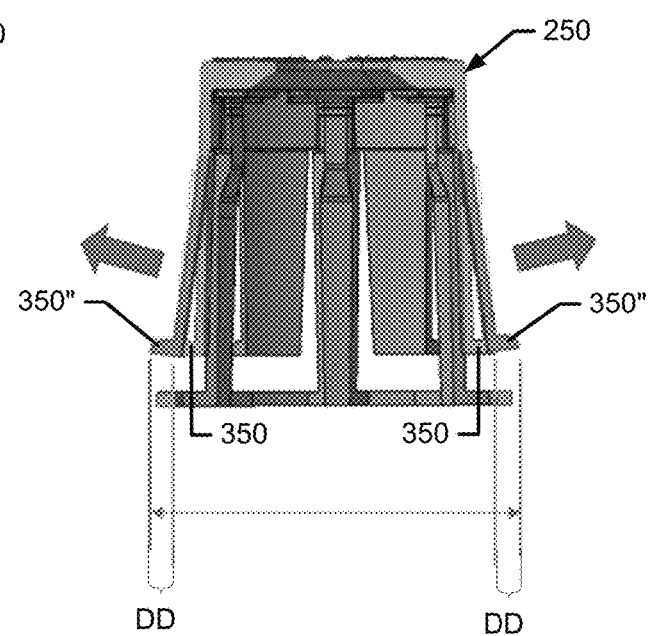

FIG. 3, which is defined by FIGS. 3A and 3B, illustrates bottom and top perspective views of a damper bump cap in accordance with an example embodiment;

FIG. 4 illustrates a side view of the damper bump cap of FIG. 3 in accordance with an example embodiment;

FIG. 5 is a cross section view of the damper bump cap taken along line A-A' of FIG. 4 in accordance with an example embodiment;

FIG. 6 is a side view showing installation of a dust gaiter onto the damper bump cap in accordance with an example embodiment;

FIG. 7 illustrates a cross section view showing an impact of insertion of the dust gaiter onto the damper bump cap in accordance with an example embodiment;

FIG. 8 is a side view showing an attempted removal of the dust gaiter from the damper bump cap in accordance with an example embodiment; and FIG. 9 illustrates a cross section view showing an impact of the attempted removal of the dust gaiter from the damper bump cap in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some embodiments may provide an improved shock or suspension system design that employs easy to install dust gaiters. In this regard, for example, some embodiments may provide for a self-seating dust gaiter based on the structures employed on the damper bumper cap (or bump cap). As a result, installation may require little effort, and the dust gaiter may even be seated automatically (e.g., self-seating in response to jounce movements).

Figure 1:
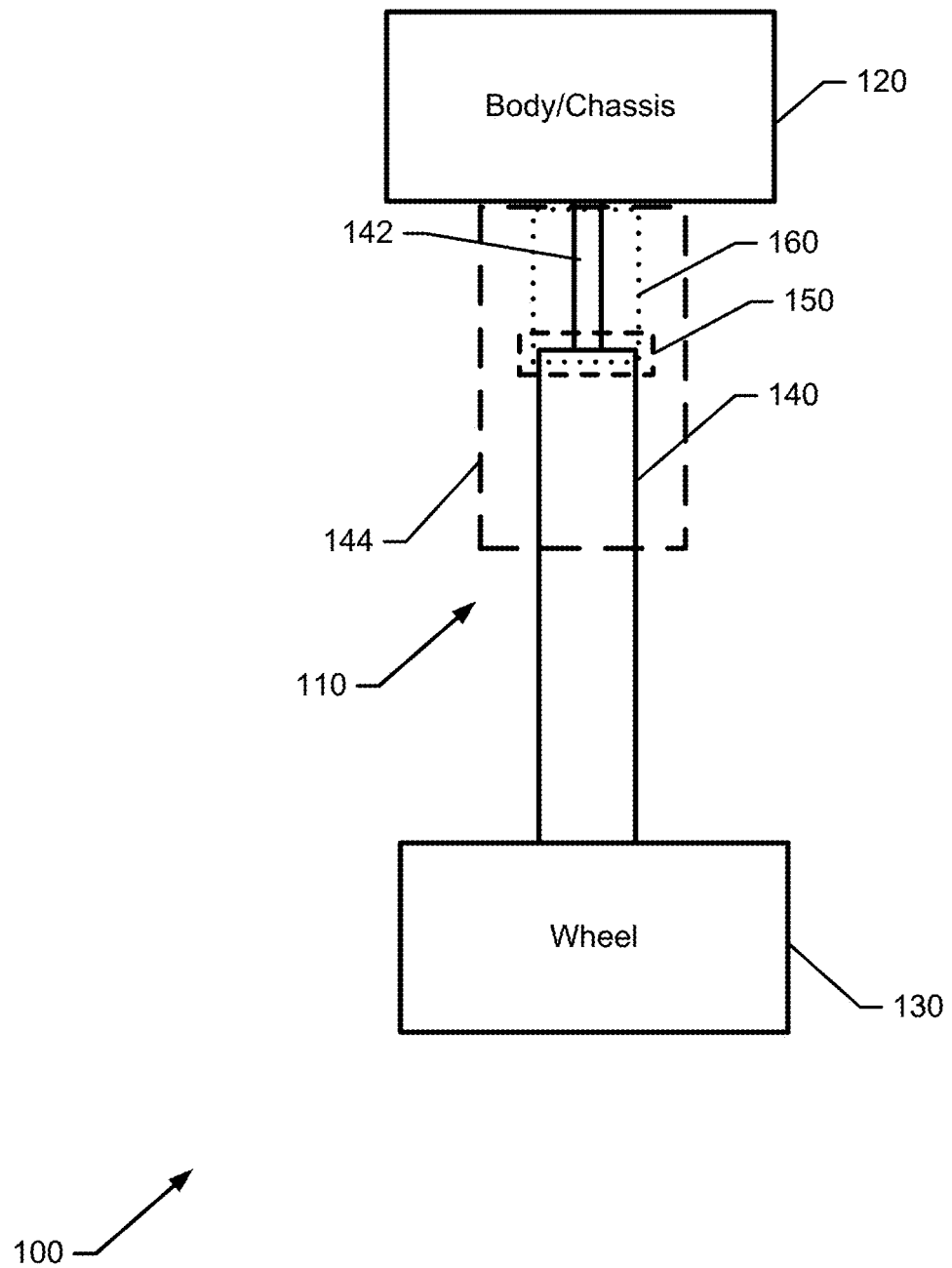
FIG. 1 illustrates a block diagram of a vehicle suspension system in accordance with an example embodiment.

FIG. 1 illustrates a block diagram of a vehicle suspension system 100 employing a coil-over damper 110. The suspension system 100 employs the coil-over damper 110 to dampen jounce and rebound forces that may be initiated between a body or chassis 120 of the vehicle and a wheel 130 (or wheel assembly components). In this regard, the coil-over damper 110 operably couples the chassis 120 to the wheel 130. The coil-over damper 110 may include a strut module or damper tube 140 with a rod 142 that extends into the damper tube 140. The rod 142 may be operably coupled to the damper tube 140 in such a way as to resist movement of the rod 142 via gas, fluid, springs, or other damping media that may be disposed within the damper tube 140.

As noted above, the coil-over damper 110 may include a coil spring 144 that extends over at least a portion of the damper tube 140. It may be desirable to prevent any dust or debris from getting into the interface between the rod 142 and the damper tube 140. To provide a seal against such dust or debris, a damper bump cap 150 may be provided to support dust gaiter (or bellows) 160. The dust gaiter 160 may be affixed to the damper tube 140 via the damper bump cap 150. To avoid any requirement for the operator to reach through the coils of the coil spring 144 to attempt to seat the dust gaiter 160 onto the damper bump cap 150, the damper bump cap 150 may be designed with structural features as described in greater detail below to provide easy effort installation that may, in some cases, actually also be self-seating.

Figure 2:
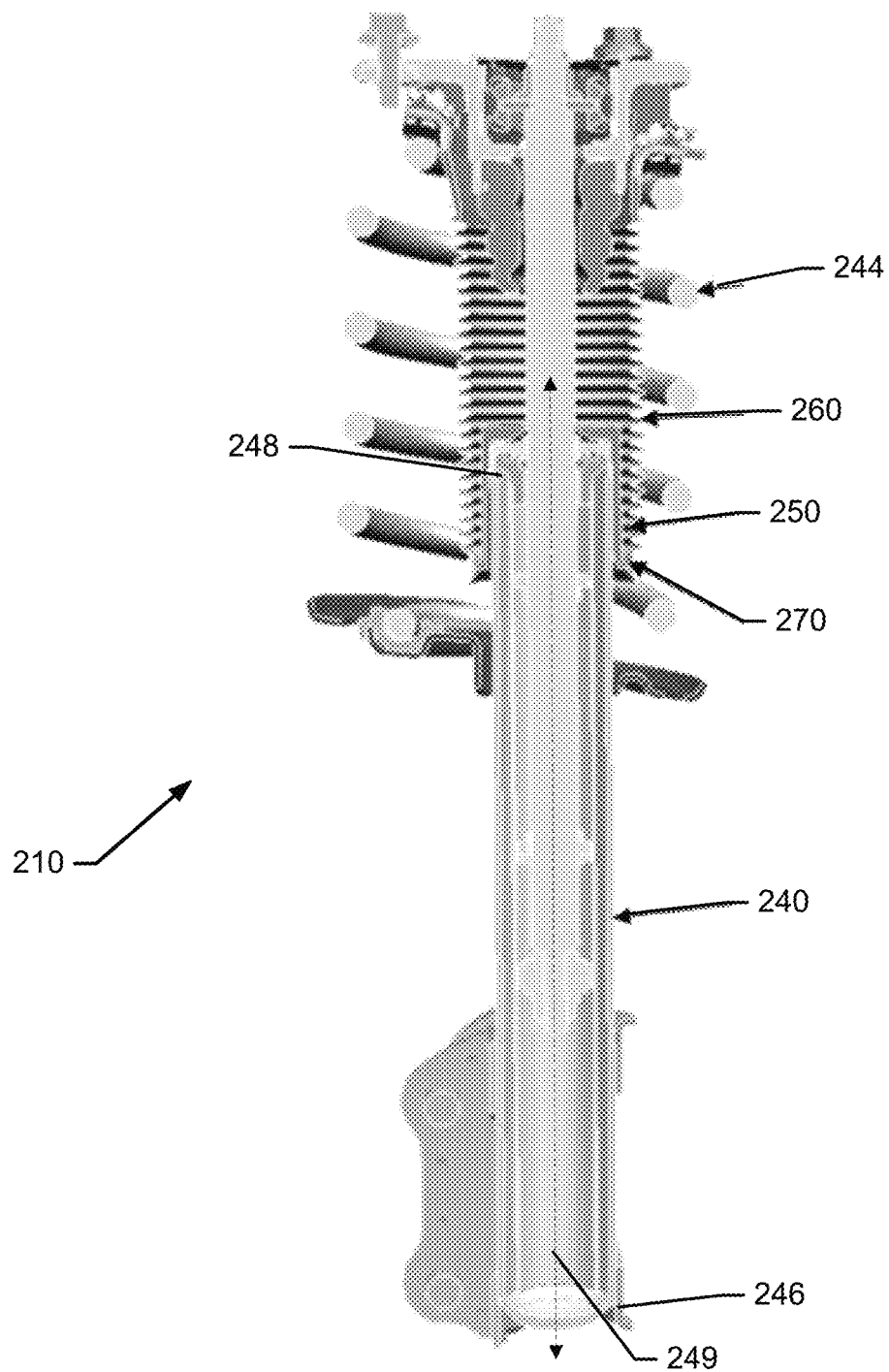
FIG. 2 illustrates a cross section view of a coil-over shock absorber in accordance with an example embodiment.

FIG. 2 shows a specific example of some structures that may be employed to instantiate the components described above. In this regard, coil-over damper 210, which is illustrated in FIG. 2 includes damper tube 240 (or strut module) with a rod 242 that extends into the damper tube 240. The damper tube 240 has a first end 246 and a second end 248 that is opposite the first end 246. The coil spring 244 that extends over at least a portion of the damper tube 240 (e.g., the first end 246 in this example), and around an interface between the rod 242 and the damper tube 240.

The damper tube 240 may also have an axis 249 that extends from the first end 246 to the second end 248. The axis 249 may also be aligned with an axis of the rod 242, and may further be coaxial with the coil spring 244 in some cases. A damper bump cap 250 (or bumper cap) may be operably coupled to the second end 246 of the damper tube 240 to support dust gaiter 260. Thus, the dust gaiter 260 may be easily affixed to the damper tube 240, and reliably retained thereto, via the damper bump cap 250. The damper bump cap 250 may be provided with flexible clips 270 as described in greater detail below in order to attach the dust gaiter 260 to the damper bump cap 250 in this manner.

An example of the damper bump cap 250 is shown in greater detail in FIGS. 3, 4 and 5. In this regard, FIG. 3, which is defined by FIGS. 3A and 3B, shows perspective views of the damper bumper cap 250 from bottom and top perspectives, respectively. FIG. 4 illustrates a side view of the damper bumper cap 250, and FIG. 5 shows a perspective view of a cross section taken along line A-A' of FIG. 4.

Referring now to FIGS. 3-5, the damper bump cap 250 may have a cover portion 300 and a retention portion 310. The cover portion 300 may have a circular end plate 320 having a rod aperture 322 formed at a center thereof. The rod 242 may extend through the rod aperture 322 with a relatively small clearance. The cover portion 300 may also include a sidewall portion 324 that extends away from the end plate 320 in one direction. The sidewall portion 324 may be substantially continuous as it extends away from the end plate 320 in the one direction such that the end plate 320 and the sidewall portion 324 combine to form a cylindrical cup. The cover portion 300 may be operably coupled to the second end 248 of the damper tube 240 to substantially seal the interface between the damper tube 240 and the rod 242.

The retention portion 310 may extend along a lateral periphery of the damper tube 240 proximate to the second end 248. The retention portion 310 may extend away from the cover portion 300 (e.g., to an opposite end or distal end of the damper bump cap 250 relative to the cover portion 300). The retention portion 310 may be defined by a continuous ring 330 at the distal end of the damper bump cap 250 relative to the cover portion 300. The continuous ring 330 may define a limit for movement of the dust gaiter 260 along the damper bump cap 250 in the axial direction when the dust gaiter 260 is installed onto the damper bump cap 250. The continuous ring may 330 be retained by a plurality of fixed fingers 332 that extend from the cover portion 300 to the continuous ring 330. In some cases, the fixed fingers 332 may extend away from a distal end of the sidewall portion 324 of the cover portion 300. Moreover, it may be possible, in some cases, for the sidewall portion 324 to be eliminated such that the fixed fingers 322 may extend away from the end plate 320.

In an example embodiment, a movable finger 340 may be disposed between each adjacent one of the fixed fingers 332. Thus, for example, each instance of the movable finger 340 may extend away from the sidewall portion 324 (or the end plate 320) in a gap 342 formed between each of the adjacent pairs of fixed fingers 332. The movable fingers 340 may each have a radial deflection rate of less than about 8 N/mm. This stands in contrast to the stiffer fingers of structurally different conventional caps, which tend to range between about 10-15 N/mm. Moreover, some example embodiments may provide the movable fingers 340 to have a radial deflection rate of between about 0.5 N/mm and 4 N/mm. The depicted example has a measured radial deflection rate of less than about 1 N/mm. Each movable finger 340 may have a finger body 344 that extends axially toward the continuous ring 330 in the gap 342 and may terminate at a radially extending locking tab 350 to engage the dust gaiter 260. Notably, the radial deflection rate noted above may be measured at the locking tabs 350. Each moveable finger 340 has a length ($L_M$) of greater than about 60% of a length (LF) of the fixed fingers 332 (and therefore also the axial length of the gap 342). Moreover, in some embodiments, the length ($L_M$) of the movable finger 340 may be as much as 90% to 95% of the length (LF) of the fixed fingers 332.

By making the movable fingers 340 relatively long compared to the fixed fingers 332, the movable fingers 340 are given a greater amount of flexibility. The flexibility may be enhanced by making the movable fingers 340 thinner than the fixed fingers 332 as well. In this regard, for example, FIG. 5 shows a thickness ($T_M$) of the movable finger 340 may be less than a thickness ($T_F$) of the fixed fingers 332. For example, if the thickness ($T_M$) of the movable finger 340 is about 2 mm in one case, then the thickness ($T_F$) of the fixed fingers 332 may be about 2.6 mm. In some embodiments, the thickness ($T_M$) of the movable finger 340 may be between about 60% to about 80% of the thickness ($T_F$) of the fixed fingers 332. Meanwhile, a width of the movable finger 340 may be greater than a width of the fixed fingers 332, and such width may decrease as distance from the continuous ring 330 decreases. In other words, the movable fingers 340 may get less wide as they extend toward the locking tabs 350. An inner diameter of the cover portion 300 at the end plate 320 may be less than an inner diameter of the retention portion 310 at the continuous ring 330 to provide some space between the inside of the movable finger 340 and the outer periphery of the damper tube 240 to enable the movable finger 340 to flex inwardly. The thinner nature of the movable finger 340 relative to the fixed fingers 332 may add additional clearance to provide space for movement and flexibility of the movable fingers 340. This structure provides an installation force to fully seat the dust gaiter 260 onto the damper bump cap 250 with an even force on all of the locking tabs 350 that is below about 25 N. Meanwhile, conventional caps typically require a force of between about 70-110 N.

The locking tab 350 at the distal end of each respective one of the movable fingers 340 may be a same distance (i.e., the length ($L_M$)) from the end plate 320. Moreover, the outer periphery of the locking tabs 350 may combine to form a discontinuous ring as compared to the continuous ring 330. The discontinuous ring is also equidistant from the continuous ring 330 at all points thereof. The discontinuous ring forms a flexible engagement interface to retain the dust gaiter 260 on the damper tube 240, whereas the continuous ring 330 prevents movement beyond the continuous ring 330 in the axial direction. Thus, the dust gaiter 260 may reliably installed onto the damper bump cap 250 without any need to fully seat the dust gaiter 260 on the discontinuous ring. Instead, any jounce event that compresses the coil-over damper 210 will tend to push the dust gaiter 260 until the discontinuous ring engages the dust gaiter 260 to retain the dust gaiter 260 as shown in reference to FIGS. 6-9.

FIG. 6 shows how the dust gaiter 260 being installed over the damper bumper cap 250 in accordance with an example embodiment, and FIG. 7 illustrates a cross section view of the damper bumper cap 250 to show the results at the damper bumper cap 250 that occur responsive to such installation. In this regard, the dust gaiter 260 may have a first end 400 and a second end 410. The dust gaiter 260 may have sidewalls 420 that extend from the first end 400 to the second end 410, and the sidewalls 420 may include radial grooves and ridges that define a waved pattern that repeats from the first end 400 to the second end 410. The waved pattern may provide some amount of flexibility for expandability or retractability as the dust gaiter 260 extends or contracts responsive to rebound and jounce events.

The first end 400 may interface with and/or be secured to a portion of the chassis or body, or an intermediate component attached thereto. The second end 410 may slide over the damper bump cap 250 until a retention groove 430 disposed proximate to the second end 410 is able to interface with the locking tabs 350. In this regard, for example, the material of the dust gaiter 260 that forms the retention groove 430 may slide over the locking tabs 350 responsive to lowering of the damper bump cap 250 (e.g., in the direction of arrow 440), and may push or urge the locking tabs 350 inward. The movable fingers 340 may then move inwardly (e.g., toward the outer peripheral sides of the damper tube 240) by pivoting as shown by arrows 450 in FIG. 7. Once the locking tabs 350 are aligned with the retention groove 430, the locking tabs 350 may engage the retention groove 430 to retain the second end 410 of the dust gaiter 260 on the damper bump cap 250. FIG. 7 shows a distance (D) that the locking tabs 350 may move inwardly responsive to the operations described above, and the position of the locking tabs 350' in FIG. 7 shows the deflected location to which the locking tabs 350 are moved. Notably, the second end 410 of the dust gaiter 260 may not be urged past the continuous ring 330, and the continuous ring 330 may therefore define a limit to the movement of the dust gaiter 260 in the axial direction (shown by arrow 440).

FIG. 8 illustrates a cross section view of the dust gaiter 260 and the damper bump cap 250 to show the locking tabs 350 engaged in the retention groove 430. When a force is exerted upwardly as shown by arrow 460 in FIG. 8, the locking tabs 350 may be urged outwardly to an extended position shown by locking tabs 350" in FIG. 9. A deflection distance (DD) may be defined by this force exertion, and the locking tabs 350 may actually engage the retention groove 430 more deeply, and prevent removal of the dust gaiter 260. The effective diameter of the discontinuous ring formed by the locking tabs 350 may therefore decrease for easy installation, and increase for prevention of removal of the dust gaiter 260 from the damper bump cap 250. Thus, as can be appreciated from FIG. 6-9, a relatively low installation force (including a jounce event) may be used to seat (or self-seat) the dust gaiter 260 onto the damper bump cap 250. However, a higher retention force is created. Moreover, the thickness of the movable fingers 340 may be made thinner to provide more flexibility, or thicker to reduce flexibility. As such, the thickness of the movable fingers 340 may be adjusted to "tune" the installation force to a desired level (e.g., to permit self-seating instead of manual engagement of the dust gaiter 260 by reaching through spring coils). In this regard, a typical bump cap can only adjust a diameter of the cap portion and/or retention portion in order to change the retention force. However, increasing retention force necessarily also requires an increase in the force needed for installation. Meanwhile, example embodiments decouple these competing interests, so that increased retention force can be achieved while also increasing the ease of install (i.e., reducing the installation forces needed).

A shock absorber for a vehicle suspension system of an example embodiment may therefore be provided. The shock absorber may include a damper tube having an axis defining an axial direction extending between a first end and a second end, a bumper cap, and a dust gaiter operably coupled to the bumper cap. The bumper cap may have a cover portion and a retention portion. The cover portion may be operably coupled to the second end of the damper tube, and the retention portion may extend along a lateral periphery of the damper tube to an opposite end of the bumper cap relative to the cover portion. The retention portion may include a continuous ring at a distal end of the bumper cap relative to the cover portion to define a limit for movement of the dust gaiter along the bumper cap in the axial direction. The continuous ring may be retained by a plurality of fixed fingers that extend from the cover portion to the continuous ring. A movable finger is disposed between each of the fixed fingers, each instance of the movable finger having a radially extending locking tab to engage the dust gaiter. Each instance of the moveable finger has a radial deflection rate of less than about 8 N/mm. In some cases, the radial deflection rate may be between about 0.5 to about 4 N/mm.

The shock absorber of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the moveable finger may have a length of greater than about 60% of a length of the fixed fingers (or greater than 90% in some cases). In an example embodiment, the movable finger may be thinner than the fixed fingers. In some cases, a thickness of the movable finger may be between about 60% to about 80% of a thickness of the fixed fingers. In an example embodiment, the movable finger may be wider than the fixed fingers. In some cases, each instance of the locking tab may combine with all of the other instances of the locking tab to form a discontinuous ring that is parallel to and spaced apart from the continuous ring. In an example embodiment, a diameter of the discontinuous ring decreases when the dust gaiter is inserted onto the bumper cap. In some cases, a diameter of the discontinuous ring may increase when a force is exerted on the dust gaiter in a direction tending to remove the dust gaiter from the bumper cap. In an example embodiment, a gap may be formed between adjacent ones of the fixed fingers, and the movable finger may be formed in the gap and spaced apart from edges of the fixed fingers. In some cases, each instance of the movable finger may be flexible inwardly to enable self-seating of the dust gaiter onto the bumper cap responsive to a jounce event. In an example embodiment, each instance of the movable finger may be flexible outwardly to prevent removal of the dust gaiter from the bumper cap. In some cases, a width of the movable finger may decrease as distance from the continuous ring decreases.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A bumper cap for a shock absorber of a vehicle suspension system, the bumper cap comprising:
    a cover portion for interfacing with a damper tube of the shock absorber, the damper tube having an axis defining an axial direction extending between a first end and a second end; and
    a retention portion extending along a lateral periphery of the damper tube to an opposite end of the bumper cap relative to the cover portion,
    wherein the retention portion comprises a continuous ring at a distal end of the bumper cap relative to the cover portion to define a limit for movement of a dust gaiter along the bumper cap in the axial direction,
    wherein the continuous ring is retained by a plurality of fixed fingers that extend from the cover portion to the continuous ring,
    wherein a movable finger is disposed between each of the fixed fingers, each instance of the movable finger having a radially extending locking tab to engage the dust gaiter, and
    wherein the moveable finger has a radial deflection rate of less than about 8 N/mm.

2. The bumper cap of claim 1, wherein the moveable finger has a length of greater than about 60% of a length of the fixed fingers.

3. The bumper cap of claim 1, wherein the movable finger is thinner than the fixed fingers.

4. The bumper cap of claim 3, wherein a thickness of the movable finger is between about 60% to about 80% of a thickness of the fixed fingers.

5. A shock absorber for a vehicle suspension system, the shock absorber comprising:
    a damper tube having an axis defining an axial direction extending between a first end and a second end;
    a bumper cap having a cover portion and a retention portion, the cover portion operably coupled to the second end of the damper tube, and the retention portion extending along a lateral periphery of the damper tube to an opposite end of the bumper cap relative to the cover portion; and
    a dust gaiter operably coupled to the bumper cap,
    wherein the retention portion comprises a continuous ring at a distal end of the bumper cap relative to the cover portion to define a limit for movement of the dust gaiter along the bumper cap in the axial direction,
    wherein the continuous ring is retained by a plurality of fixed fingers that extend from the cover portion to the continuous ring, wherein a movable finger is disposed between each of the fixed fingers, each instance of the movable finger having a radially extending locking tab to engage the dust gaiter, and wherein the moveable finger has a radial deflection rate of less than about 8 N/mm.

6. The shock absorber of claim 5, wherein the moveable finger has a length of greater than about 60% of a length of the fixed fingers.

7. The shock absorber of claim 5, wherein the movable finger is thinner than the fixed fingers.

8. The shock absorber of claim 7, wherein a thickness of the movable finger is between about 60% to about 80% of a thickness of the fixed fingers.

9. The shock absorber of claim 5, wherein the movable finger is wider than the fixed fingers.

10. The shock absorber of claim 5, wherein each instance of the locking tab combines to form a discontinuous ring that is parallel to and spaced apart from the continuous ring.

11. The shock absorber of claim 10, wherein a diameter of the discontinuous ring decreases when the dust gaiter is inserted onto the bumper cap.

12. The shock absorber of claim 10, wherein a diameter of the discontinuous ring increases when a force is exerted on the dust gaiter in a direction tending to remove the dust gaiter from the bumper cap.

13. The shock absorber of claim 5, wherein a gap is formed between adjacent ones of the fixed fingers, and wherein the movable finger is formed in the gap and spaced apart from edges of the fixed fingers.

14. The shock absorber of claim 5, wherein each instance of the movable finger is flexible inwardly to enable self-seating of the dust gaiter onto the bumper cap responsive to a jounce event.

15. The shock absorber of claim 14, wherein each instance of the movable finger is flexible outwardly to prevent removal of the dust gaiter from the bumper cap.

16. The shock absorber of claim 5, wherein a width of the movable finger decreases as distance from the continuous ring decreases.

17. A suspension system for a vehicle, the suspension system comprising:

a chassis;

a wheel; and a coil-over shock absorber operably coupling the chassis and the wheel, wherein the shock absorber comprises:

a damper tube having an axis defining an axial direction extending between a first end and a second end, a bumper cap having a cover portion and a retention portion, the cover portion operably coupled to the second end of the damper tube, and the retention portion extending along a lateral periphery of the damper tube to an opposite end of the bumper cap relative to the cover portion, and a dust gaiter operably coupled to the bumper cap, wherein the retention portion comprises a continuous ring at a distal end of the bumper cap relative to the cover portion to define a limit for movement of the dust gaiter along the bumper cap in the axial direction, wherein the continuous ring is retained by a plurality of fixed fingers that extend from the cover portion to the continuous ring, wherein a movable finger is disposed between each of the fixed fingers, each instance of the movable finger having a radially extending locking tab to engage the dust gaiter, and wherein the moveable finger has a radial deflection rate of less than about 8 N/mm.

18. The suspension system of claim 17, wherein the moveable finger has a length of greater than about 60% of a length of the fixed fingers.

19. The suspension system of claim 17, wherein the movable finger is thinner than the fixed fingers.

20. The suspension system of claim 19, wherein a thickness of the movable finger is between about 60% to about 80% of a thickness of the fixed fingers.

* * * * *